(12) United States Patent
Funk et al.

(10) Patent No.: US 9,243,773 B2
(45) Date of Patent: Jan. 26, 2016

(54) HEADLIGHTS FOR A MOTOR VEHICLE

(75) Inventors: Christian Funk, Gaimersheim (DE); Wolfgang Huhn, Reichertshofen (DE)

(73) Assignee: AUDI AG, Ingolstadt (DE)

( * ) Notice: Subject to any disclaimer, the term of this patent is extended or adjusted under 35 U.S.C. 154(b) by 225 days.

(21) Appl. No.: 13/555,592

(22) Filed: Jul. 23, 2012

(65) Prior Publication Data

US 2013/0021810 A1 Jan. 24, 2013

(30) Foreign Application Priority Data

Jul. 22, 2011 (DE) .......................... 10 2011 108 384

(51) Int. Cl.
*F21S 8/10* (2006.01)
*B60Q 1/14* (2006.01)

(52) U.S. Cl.
CPC ............. *F21S 48/1747* (2013.01); *B60Q 1/143* (2013.01); *F21S 48/115* (2013.01); *B60Q 2300/11* (2013.01); *B60Q 2300/122* (2013.01); *B60Q 2300/13* (2013.01); *B60Q 2300/322* (2013.01); *B60Q 2300/40* (2013.01)

(58) Field of Classification Search
CPC ........ B60Q 1/076; B60Q 1/08; B60Q 1/1415; B60Q 1/16; B60Q 2300/13; B60Q 2300/132; B60Q 2300/134; B60Q 2300/54; B60Q 2300/40–2300/45; F21S 48/115; F21S 48/1154; F21S 48/17; F21S 48/1705; F21S 48/1747

USPC ............ 362/464–467, 36, 508, 522, 545, 548
See application file for complete search history.

(56) References Cited

U.S. PATENT DOCUMENTS

| 5,931,576 | A | 8/1999 | Kreysar et al. | |
| 2004/0263346 | A1* | 12/2004 | Neal | 340/815.45 |
| 2011/0267455 | A1* | 11/2011 | Gotz et al. | 348/135 |

FOREIGN PATENT DOCUMENTS

| DE | 102007040042 | 2/2009 |
| DE | 102007044936 | 4/2009 |
| DE | 102007063183 | 6/2009 |
| DE | 102008062640 | 7/2009 |
| DE | 102008036193 | 2/2010 |
| DE | 102008062639 | 6/2010 |
| DE | 102010006296 | 9/2010 |

* cited by examiner

*Primary Examiner* — Laura Tso
(74) *Attorney, Agent, or Firm* — Henry M. Feiereisen LLC

(57) ABSTRACT

A headlight for a motor vehicle includes a plurality of illuminants, wherein the illuminants are arranged in a matrix which has a first direction of extension and a second direction of extension which is perpendicular to the first direction of extension. In order to operate the headlight more efficiently a value of the luminance is individually adjustable for each of the illuminants, and the value of the luminance of the respective illuminants is adjustable in dependence on a position of the illuminants along the first direction of extension and/or the second direction of extension according to at least one predetermined distribution function.

9 Claims, 2 Drawing Sheets

HEADLIGHTS FOR A MOTOR VEHICLE

CROSS-REFERENCES TO RELATED APPLICATIONS

This application claims the priority of German Patent Application, Serial No. 10 2011 108 384.0, filed Jul. 22, 2011, pursuant to 35 U.S.C. 119(a)-(d), the disclosure of which is incorporated herein by reference.

BACKGROUND OF THE INVENTION

The present invention relates to a headlight of a motor vehicle.

The following discussion of related art is provided to assist the reader in understanding the advantages of the invention, and is not to be construed as an admission that this related art is prior art to this invention In modern motor vehicles, headlights with light emitting diodes (LEDs) are increasingly used. The light emitting diodes have a long service life, high energy efficiency and offer extended design options. However, these LED headlights have the disadvantage that the light emitting diodes are mechanically securely coupled to the motor vehicle. Thus, the light emitting diodes can for example not be moved as in the case of a predictive curve light which has pivotal headlights. Thus an intentional influence on the gaze behavior of the driver is not possible.

The LED headlights can be subdivided into multiple segments which usually each include multiple light emitting diodes. In particular in LED-headlights which provide a high beam function it is known to assign corresponding segments to an approaching vehicle which was detected by a camera. The corresponding segments can be switched off so that the driver of the detected vehicle is not blinded.

SUMMARY OF THE INVENTION

According to one aspect of the present invention, a headlight of a motor vehicle includes a plurality of illuminants, wherein the illuminants are arranged in a matrix with a first direction of extension and a second direction of extension which is perpendicular to the first direction of expansion, and wherein for each of the illuminants a respective value of the light emitting diode is individually adjustable and the value of the luminance of the respective illuminants is adjustable in dependence on a position of the illuminants along the first direction of extension and/or the second direction of extension according to at least one predetermined distribution function.

The individual illuminants in a headlight, in particular in a front headlight for a motor vehicle are individually controlled. Thus, the respective luminances which are provided by the illuminants can be adjusted in a flexible manner. Such a headlight can also be subdivided into multiple segments in each of which one or more respective illuminants are arranged. In this case the headlight can be configured so that the value for the luminance of the illuminants can be commonly adjusted for one segment. It is also conceivable that the value for the light density is separately adjustable for each illuminant in one segment. In this way individual illuminants of the headlight can be controlled so that they have a lesser luminance than the other illuminants. Thus the illuminants require less electrical energy and as a consequence the headlight can be operated more effectively.

The values of the luminance of the respective illuminants are set or respectively, adjusted to follow at least one predetermined distribution function in dependence on the position along an extension line of the headlight. The extension line of the headlight can for example be a direction of extension which is horizontal or vertical with regard to the headlight. Any other direction of extension of the headlight is also conceivable. The individual illuminants can also be arranged so that the values of the luminance each are defined by different distribution functions in dependence on the position of the illuminants along different directions of extension.

Preferably, the predetermined distribution function is a discretized normal distribution. When the predetermined distribution function corresponds to a normal distribution function or respectively, a Gaussian distribution the respective illuminants or the segments in a middle region of the headlight have a higher luminance than at the border or respectively, have the maximal luminance. The value of the luminance of the illuminants decreases towards the border region of the headlight. Any other predetermined distribution function is also conceivable. The distribution function is to be selected so as to result in a pleasant driving experience for the driver and so that the road is particularly well illuminated.

In a further embodiment the illuminants have a higher luminance in a first region of the headlight which is formed by a center of the distribution function than in a second region of the headlight which borders the first region. The individual illuminants are preferably controlled or respectively operated so that the values of their luminance in dependence on their position in a center or respectively, a maximum of the distribution function are higher compared to the values of the luminances of the remaining illuminants or respectively, reach a maximal value. Thus by controlling the illuminants the entire headlight can be subdivided into at least two regions with different values of the luminance of the illuminants.

In a further embodiment of the invention at least two of the illuminants are respectively arranged adjacent to one another in the first and second directions of extension. The headlight usually includes multiple illuminants which are arranged in a matrix in a first and a second direction of extension of the headlight. The illuminants are thus arranged in the headlight according to a two dimensional matrix, wherein the individual illuminants can be individually controlled. In this way the light distribution which is generated by the headlight can be adjusted particularly accurately.

According to another advantageous feature of the present invention each of the illuminants can be operable with an electric current, and the value of the luminance of the respective illuminant is adjustable by a pulse width modulation of the electric current. The value of the luminance of the respective illuminants can be achieved in a particularly simple manner by a pulse width modulation of the current. Preferably each illuminant is assigned a corresponding electronic unit which enables a pulse width modulation of the electric current with which the illuminant is operated. Also, each segment of the headlight which includes multiple illuminants can be assigned a corresponding electronic unit.

According to another advantageous feature of the present invention, the illuminants can be light emitting diodes. Usually light emitting diodes are used which generate a white light and which can be used for operation in a front headlight of a motor vehicle. The light emitting diodes are characterized by their long service life and their energy efficiency.

According to another aspect of the present invention a motor vehicle is provided with a previously described headlight. The headlight is preferably a front headlight of the motor vehicle.

According to another advantageous feature of the present invention the motor vehicle can include a first assistance system wherein the distribution function of the values of the luminance of the illuminants in the headlight is changed by the first assistance system in dependence on a course of the road and/or in dependence on an object which is present in a vicinity of the motor vehicle. An assistance system of the vehicle allows determining a predictive road course. This can for example occur by means of a navigation system. Forward looking environmental sensors such as a camera, a radar sensor a lidar sensor or the like can also be used. With the environmental sensors objects or respectively, obstacles which are present on and/or adjacent to the road can also be detected.

The distribution function of the values of the luminance of the illuminants can be adjusted by the assistance system in dependence on the road course and/or the detected object. For this, the position of the center of the distribution function can be adjusted correspondingly. In other words, the region in the headlight in which the illuminants have a higher or the maximal luminance is shifted in dependence on the road course and/or the detected object. For this, the surface of the region in which the illuminants have a higher or the maximal luminance can also be enlarged or decreased. In addition, the position as well as the surface of this region can be changed by the assistance system. In this way the light beam which is generated by the headlight can be adjusted so that the road course is particularly well illuminated, thus enabling the functionality of a predictive curve light. Further, the illuminants can be controlled based on the distribution function so that the drivers of approaching cars are not blinded. In this way the safety for the driver of the motor vehicle and for the other road users is significantly increased.

According to another advantageous feature of the present invention the motor vehicle can have a second assistance system, wherein the distribution function of the values of the luminance of the illuminants in the headlight can be changed by the second assistance system in dependence on a steering angle, a yaw rate, an inclination, a speed and/or an acceleration of the motor vehicle.

With the second assistance system which for example receives the data of corresponding car body sensors, inertia sensors, rotational speed sensors, or the like the distribution function of the values for the luminance of the illuminants can also be changed. As described before, the position and/or the surface of the center of the distribution function in the headlight can also be adjusted accordingly. Thus the light beam generated by the headlight can be adjusted in dependence on the steering motion of the driver. In addition, the light beam can be adjusted to the speed of the motor vehicle. For this, sensors can be used which are usually present in a motor vehicle.

Preferably a high beam and/or a dipped beam function of the headlight can be provided by a control device of the motor vehicle. The previously described headlight can be used as a high beam headlight and as a dipped beam headlight. For this purpose the motor vehicle includes a corresponding control device by means of which the respective illuminants or respectively, light emitting diodes can be controlled correspondingly.

According to another aspect of the present invention a method for the operation of a headlight for a motor vehicle includes individually adjusting a value of a luminance of each of multiple illuminants of the head light, wherein the illuminants are arranged in a matrix, wherein the matrix has a first direction of extension and a second direction of extension which is perpendicular to the first direction of extension, and wherein the value of the luminance is adjusted as a function of a position of the illuminant along the first direction of extension and/or the second direction of extension and in accordance with at least one predetermined distribution function.

The refinements which are described with reference to the headlight according to the invention can be transferred correspondingly to the method for operating a headlight.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
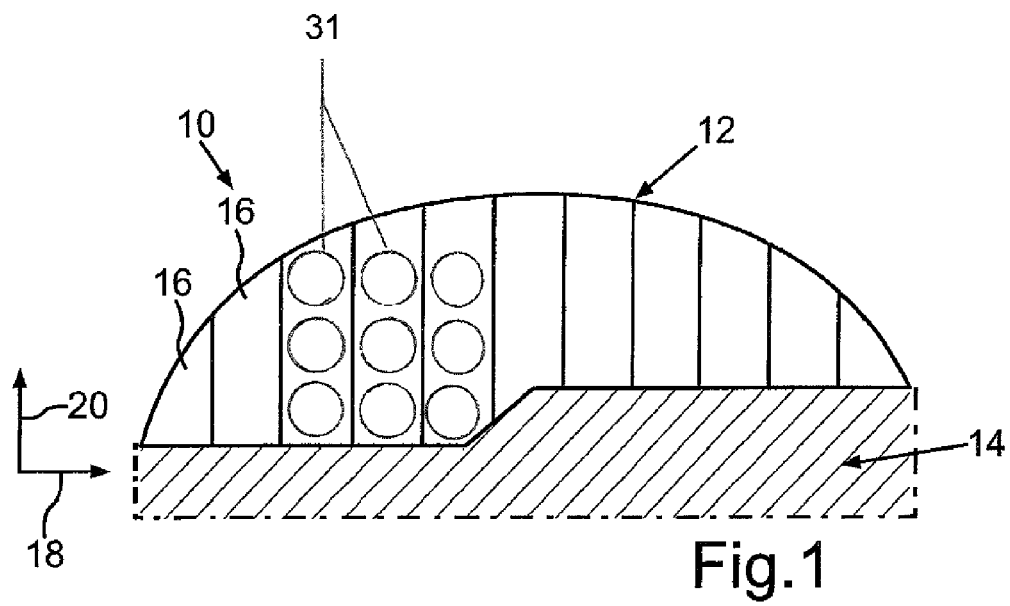
FIG. 1 shows a schematic representation of a headlight for a motor vehicle.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a plan view of a headlight 10 for a motor vehicle in a schematic representation. The headlight 10 is preferably a front headlight for a motor vehicle. The headlight 10 includes a high beam headlight 12 and a dipped beam headlight. In FIG. 1 only the high beam headlight 12 is shown. The position of the dipped beam headlight is indicated by the hatched region 14. In the present case, only the high beam headlight 12 is described. This description can be transferred in the same manner to the dipped beam headlight.

The headlight 10 is subdivided into multiple segments 16. Here, the headlight 10 includes for example ten segments 16. The segments 16 are here arranged distributed along the first direction of extension 18 of the headlight 10. Here the first direction of extension 18 corresponds to the horizontal extension of the headlight 10. Any other direction of extension can also be adopted. Each of the segments 16 includes one or more illuminants 31. These illuminants are preferably light emitting diodes, in particular white light emitting diodes. The majority of illuminants in the headlight 10 are usually arranged in a matrix. The matrix has a first direction of extension 18 and a second direction of extension 20 which is perpendicular to the first direction of extension 18. The illuminants 31 can either be arranged along the first direction of extension 18 or along the second direction of extension 20. Preferably at least two of the illuminants 31 are respectively arranged adjacent one another in the first direction of extension and in the second direction of extension 20 so that a two dimensional arrangement of the illuminants results in the headlight 10.

In the headlight 10 a value of the luminance is individually adjustable for each of the illuminants and the value of the luminance of the respective illuminants can be adjusted in dependence on a position of the illuminants along the first direction of extension 18 and/or the second direction of extension 20 according to at least one distribution function 24. The illuminants are operated by an electric current, wherein the value of the luminance of the respective illuminants is settable by a pulse width modulation of the electric current.

Figure 2:
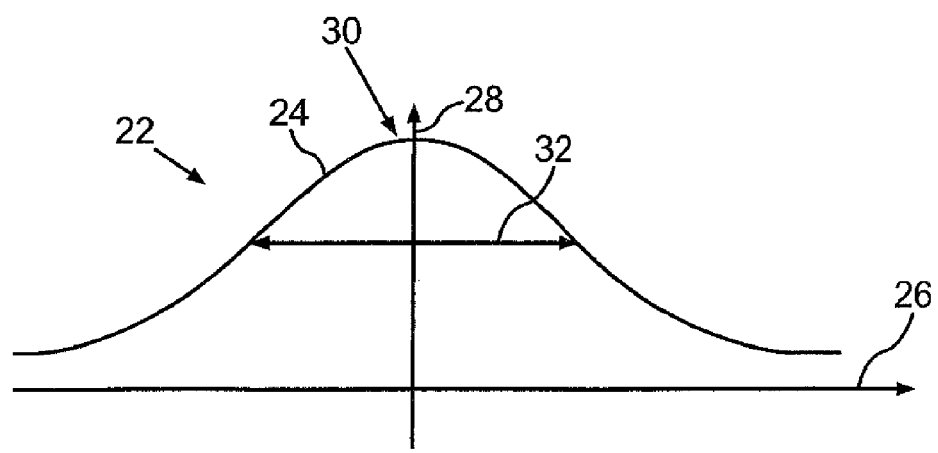
FIG. 2 shows a graph of a distribution function of values of the luminance of illuminants in dependence on a position of the illuminants along a direction of extension of a headlight.

FIG. 2 shows a graph 22 of a distribution function 24. The abscissa 26 of the graph 22 corresponds to the position of the illuminants along the first direction of extension 18. The ordinate 28 of the graph 22 corresponds to the value of the duty cycle of the pulse width modulation of the electric current with which the respective illuminants are operated. The value of the luminance of the respective illuminants can be adjusted by the duty cycle of the pulse width modulation. The distribution function shown in FIG. 2 is a normal distribution or respectively, a Gaussian distribution. However, any other distribution is also conceivable.

According to the distribution function 24 the illuminants whose position is located in the center 30 or in a maximum of the distribution function 24 are controlled so that the value of the luminance compared to the values of the luminance of the remaining illuminants has a higher value or respectively, a maximal value. Here, the center 30 of the distribution function is located in a middle region of the headlight 10. The value of the luminance of the respective illuminants decreases continuously from this border region to the border regions of the headlight 10. The distribution of the values of the luminance of the respective illuminants can be adjusted in dependence on their position by the width of the distribution function 24. In the present example, in which the distribution function is a normal distribution, the width of the distribution function corresponds to the standard deviation of the normal distribution. In FIG. 1, the latter is indicated by the arrow 32.

The light beam which is provided by the headlight 10 can be adjusted in dependence on the driving situation and/or the detected sensor data. For this purpose the motor vehicle can include one or more assistance systems. With a first assistance system for example, a predictive road course can be determined. The road course can be determined with a navigation system or with forward looking environmental sensors. Also objects or obstacles on and/or beside the road can be detected. Further, the motor vehicle can include a second assistance system with which for example a steering angle, a yaw rate, an inclination, a speed and/or an acceleration of the motor vehicle is detected by means of corresponding sensors.

The distribution function 24 of the values of the light density of the respective illuminants can be changed by at least one assistance system in dependence on their position and in dependence on the predictive road course, the detected objects and/or the aforementioned operating parameters of the motor vehicle.

Figure 3:
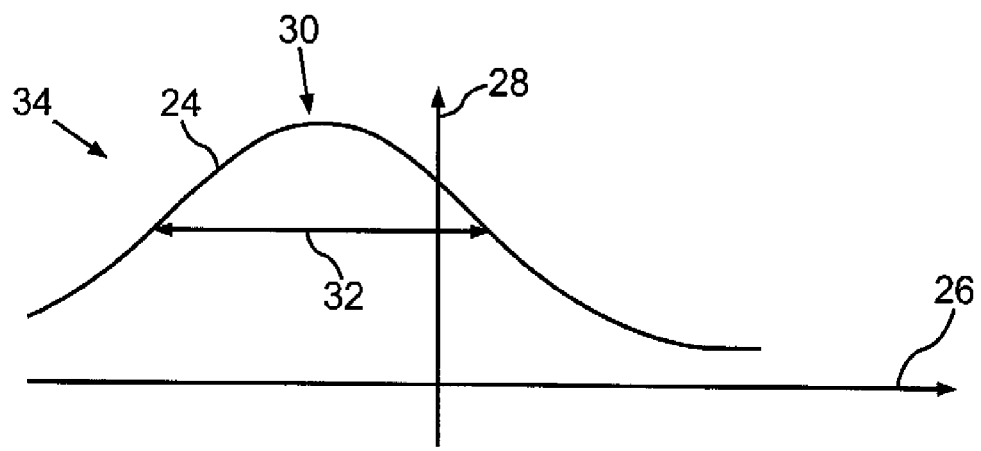
FIG. 3 shows a graph according to FIG. 2 in which the maximum of the distribution function is shifted.

FIG. 3 shows a graph 34 of a distribution function 24 according to FIG. 1. In the here shown distribution function 24 the center 30 or respectively, the maximum of the distribution function 24 compared to the distribution function shown in FIG. 1 is for example shifted to the left. This shifting of the center 30 of the distribution function 24 causes the illuminants in another region of the headlight 10 to have a higher luminance. This allows for example to correspondingly illuminate a curved course of a road with the headlight 10. Also shifting the light centers of the headlight prevents blinding of the drivers of approaching vehicles by the headlight 10. In addition, the light distribution of the headlight 10 can be adjusted to the driving situation for example to the speed of the motor vehicle.

Figure 4:
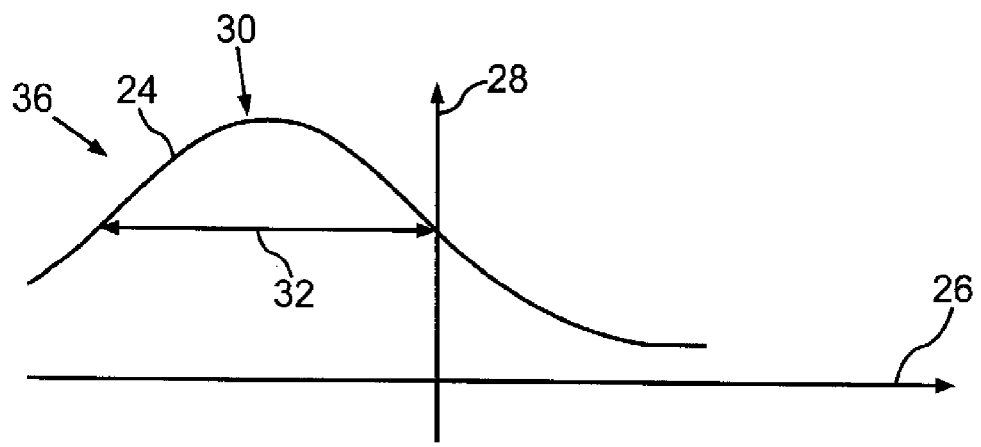
FIG. 4 shows a graph according to FIGS. 2 and 3 in which the maximum of the distribution function is shifted and the distribution function is broader.

In addition, instead of the position of the center 30 of the distribution function 24 the width of the distribution function can also be correspondingly increased or decreased in order to adjust the light beam which is generated by the headlight 10. The center 30 and the width of the distribution function 24 can also be adjusted. FIG. 4 shows a graph 36 in which the center 30 of the distribution function 24 is smaller compared to the width of the distribution function 24 which is indicated by the arrow 32.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A motor vehicle, comprising:
   a headlight, said headlight comprising a plurality of illuminants arranged in a matrix, said matrix having first and second directions of extension, wherein a value of a luminance of each illuminant is individually adjustable as a function of a position of the illuminant along the first direction of extension and/or the second direction of extension and in accordance with at least one predetermined distribution function; and
   a first assistance system determining a predictive road course by means of a navigation system and changing the distribution function as a function of the predictive road course.

2. The motor vehicle of claim 1, wherein the predetermined distribution function is a discretized normal distribution.

3. The motor vehicle of claim 1, wherein a center of the distribution function defines a first region of the headlight, and wherein the illuminants have a higher luminance in the first region than in a second region of the headlight which borders on the first region.

4. The motor vehicle of claim 1, wherein at least two of the illuminants are arranged adjacent to one another in the first and second direction of extension.

5. The motor vehicle of claim 1, wherein each of the illuminants is operable with an electric current, and wherein the value of the luminance of the respective illuminants is adjustable by a pulse width modulation of the electric current.

6. The motor vehicle of claim 1, wherein the illuminants are constructed as light emitting diodes.

7. The motor vehicle of claim 1, further comprising a second assistance system, said second assistance system changing the distribution function as a function of at least one member selected from the group consisting of a steering angle, a yaw rate, an inclination, a speed and an acceleration of the motor vehicle.

8. The motor vehicle of claim 7, further comprising a control device for implementing a high beam function and/or a dipped beam function of the headlight.

9. A method for operating a headlight for of the a motor vehicle, comprising:
- individually adjusting a value of a luminance of each of multiple illuminants of the head light, wherein the illuminants are arranged in a matrix, said matrix having a first direction of extension and a second direction of extension which is perpendicular to the first direction of extension, and wherein the value of the luminance is adjusted as a function of a position of the illuminant along the first direction of extension and/or the second direction of extension and in accordance with at least one predetermined distribution function;
- determining with an assistance system a predictive road course by means of a navigation system; and
- changing with the assistance system the distribution function as a function of the predictive road course.

\* \* \* \* \*